2,748,104
United States Patent Office
Patented May 29, 1956

2,748,104
CURING OF POLYISOBUTYLENE

Paul Viohl, Ramsey, N. J., assignor to United States Rubber Company, New York, N. Y., a corporation of New Jersey No Drawing. Application October 8, 1952, Serial No. 313,781

2 Claims. (Cl. 260—79.5)

This invention relates to the curing of polyisobutylene.

Polyisobutylene is a completely saturated hydrocarbon elastomer. It is a high molecular weight solid resembling unmilled crepe rubber in consistency at room temperatures. Polyisobutylene may be cured in the presence of sulfur and t.-butyl peroxide. The cure is evidenced by an increase in the tensile strength and modulus of the polyisobutylene. The difficulty, however, with this process is that the magnitude of the increase in the modulus of the stock leaves something to be desired.

I have now unexpectedly found that if a small amount of p-benzoquinone dioxime or its tautomer p-dinitrosobenzene, or poly-p-dinitrosobenzene is introduced into the formulation of the above process, a much greater degree of cure of the polyisobutylene elastomer is obtainable. This result is shown by a greater increase in the modulus of the polyisobutylene stocks while, at the same time, the other physical properties of the stocks remain substantially the same. Other quinone-imine compounds such as p-quinone-bis-phenylimine, and p-quinone dioxime dibenzoate do not give equivalent results; in fact the degree of cure with them is markedly below that with the quinone-imines of this invention.

A further improvement is that I am able to effectuate a much more advanced degree of cure of non-black filled polyisobutylene stocks than has heretofore been obtainable. When polyisobutylene stocks containing non-black fillers are heated in the presence of only sulfur and tertiary-butyl peroxide, cure results, but when a small amount of quinone dioxime or the p-dinitrosobenzene is added to the same stock and heat is applied, a much higher degree of cure results.

The following examples illustrate the process of my invention in more detail, the parts being by weight.

EXAMPLE 1

This example illustrates the improvement in cure of polyisobutylene-carbon black stocks obtainable by the process of the present invention.

Two separate polyisobutylene stocks were compounded with the following ingredients in the proportions indicated. The mixing was done on a two-roll mill.

| Compounding Ingredients | Stock | |
|---|---|---|
| | E | F |
| Polyisobutylene | 100 | 100 |
| Carbon black | 50 | 50 |
| Sulfur | 2 | 2 |
| t-Butyl peroxide | 5 | 5 |
| Quinone dioxime | | 2 |

The two stocks were then press-cured for sixty minutes at 166° C. The press was cooled to ambient temperatures before removal of the cured stocks. The pertinent physical properties of the cured stocks are given in the following table.

| | Scott Tensile | Elongation at Break, Percent | Modulus (S-300%) | Modulus (S-500%) | Permanent Set |
|---|---|---|---|---|---|
| Stock E | 1,330 | 850 | 200 | 490 | .45 |
| Stock F | 1,380 | 730 | 360 | 875 | .28 |

The higher modulus of stock F illustrates clearly the effect of the addition of the quinone dioxime. In general, I have found that treatment of a polyisobutylene-carbon black stock containing sulfur and t-butyl peroxide by the process of the present invention causes the modulus at 300% elongation to be raised to a value above 350 p. s. i.

A high abrasion furnace black was used in the experiment described in Example 1. I obtain greater improvements in the physical properties of polyisobutylene-carbon black stocks when this type of carbon black is employed. However, substantial improvements result with all types of commercially available blacks.

EXAMPLE 2

Other fillers may be substituted for carbon black in my invention and an effective cure of the polyisobutylene obtained. This example illustrates the cure of polyisobutylene stocks containing two representative non-black fillers. The example also illustrates the much higher degree of cure obtainable by the process of the present invention as compared with that obtainable by the use of sulfur and the peroxide.

Stocks were compounded with the following ingredients in the proportions indicated. The mixing was done on a two-roll mill.

| | G | H | I | J |
|---|---|---|---|---|
| Polyisobutylene | 100 | 100 | 100 | 100 |
| Clay | 72 | | 72 | |
| Diatomaceous earth | | 60 | | 60 |
| Sulfur | 2 | 2 | 2 | 2 |
| t-Butyl peroxide | 5 | 5 | 5 | 5 |
| Quinone dioxime | 2 | 2 | | |

The four stocks were then heated in a press for 60 minutes at 166° C. The pertinent physical properties of the resultant products are indicated in the following table.

Table II

| Physical Properties | Stocks | | | |
|---|---|---|---|---|
| | G | H | I | J |
| Scott Tensile | 934 | 914 | 229 | 397 |
| Percent Elongation at break | 750 | 760 | 1,020 | 1,000 |
| Modulus (300% strain) | 225 | 250 | 45 | 75 |
| Modulus (500% strain) | 500 | 500 | 50 | 100 |

When the physical properties of stocks I and J are compared with those of stocks G and H to which quinone dioxime had been added, the nature of the improvements obtainable with my invention are readily apparent. The higher modulus and tensile strength of stocks G and H show clearly that these stocks have a much stronger cure than stocks I and J.

EXAMPLE 3

This example shows the degree of cure with a p-dinitrosobenzene:

| Compounding Ingredients | Stock K |
|---|---|
| Polyisobutylene | 100 |
| Carbon black | 50 |
| Sulfur | 2 |
| Poly-p-dinitrosobenzene | [1] 0.5 |
| t-Butyl peroxide | 5 |

[1] Poly-p-dinitrosobenzene is available commercially (du Pont) under the trade name Polyac. Polyac is a mixture of 25% poly-p-dinitrosobenzene and 75% inert material. Two parts of Polyac were used in the above experiment.

The stock was press-cured for 60 minutes at 166° C. The pertinent physical properties of the cured stock were Scott tensile 1570; elongation at break 830; modulus (S–300%) 180; modulus (S–500%) 550.

Any amount of sulfur above one-half part per 100 parts of polyisobutylene may be used in my process and an improved cure obtained. The degree of cure is independent of the sulfur concentration above two parts per 100 parts of polyisobutylene when 5 parts t.-butyl peroxide are used. In general, from 2 to 7 parts of t-butyl peroxide per 100 parts of polyisobutylene are preferred, with best cures resulting when between about 4 and about 6 parts of the peroxide are used.

Improved cures of polyisobutylene are obtained with as little as one-half part of quinone dioxime or the p-dinitrosobenzene per 100 parts of the polyisobutylene; between about 2 and about 10 parts of the quinone dioxime or the p-dinitrosobenzene are generally used, and from about 2 to about 6 parts are preferred.

The time of heating necessary to obtain a cure of the stocks of my invention is not critical. From one-half to two hours heating at a temperature of about 330° F. is generally preferred. Heating at temperatures in the range of from 200° F. to 400° F. may be used in my process; the lower temperatures in this range require a considerably longer curing time than the higher temperatures. When a curing temperature of about 330° F. is employed, curing periods longer than one-half hour do not effect a substantial change in the modulus of the stocks.

Having thus described my invention, what I claim and desire to protect by Letters Patent is:

1. A method of curing elastomeric polyisobutylene which comprises heating the elastomer in the presence of at least about one-half percent by weight of sulfur, from about two to seven percent by weight of tertiary-butyl peroxide, and at least about 0.5 percent by weight of a chemical from the group consisting of quinone dioxime, p-dinitrosobenzene, and poly-p-dinitrosobenzene, based on the weight of the uncured polyisobutylene.

2. A method of curing elastomeric polyisobutylene which comprises incorporating in the elastomer at least about one-half percent by weight of sulfur, from about two to seven percent by weight of tertiary-butyl peroxide, and from about two to about ten percent by weight of quinone dioxime, based on the weight of the uncured polyisobutylene, and heating the mixture for a time sufficient to cure the polyisobutylene.

References Cited in the file of this patent
UNITED STATES PATENTS

| 2,391,742 | Roberts | Dec. 25, 1945 |
| 2,620,323 | Sayko | Dec. 2, 1952 |